United States Patent [19]
Alston et al.

[11] Patent Number: 6,084,017
[45] Date of Patent: Jul. 4, 2000

[54] SOLVENT FOR RESIN AND POLYMER FORMULATIONS

[75] Inventors: David Robert Alston, Cottingham; Stephen Robert Hodge, Beverley; Benjamin Patrick Gracey, Paull, all of United Kingdom; David Lyons, Point Clare, Australia

[73] Assignee: BP Chemicals Limited, London, United Kingdom

[21] Appl. No.: 08/958,209

[22] Filed: Sep. 5, 1997

Related U.S. Application Data

[63] Continuation of application No. PCT/GB96/00678, Mar. 21, 1996.

[30]     Foreign Application Priority Data

Mar. 30, 1995 [GB] United Kingdom .................... 9506485

[51] Int. Cl.$^7$ ....................................................... C08K 5/06
[52] U.S. Cl. ........................................... 524/366; 524/378
[58] Field of Search ...................................... 524/366, 378

[56]     References Cited

FOREIGN PATENT DOCUMENTS

| 47047878 | of 1980 | Japan . |
| 57121070 | of 1982 | Japan . |
| 810000569 | of 1982 | Japan . |
| 890200252 | of 1991 | Japan . |

*Primary Examiner*—Edward J. Cain
*Attorney, Agent, or Firm*—Fay, Sharpe, Fagan, Minnich & McKee, LLP

[57]     ABSTRACT

This invention relates to non-aqueous formulations comprising resins and/or polymers with a higher solids content and a solvent which is a diether of the general formula: $R.O.R^1.O.R^2$, wherein each of R, $R^1$ and $R^2$ is a straight or branched chain, saturated aliphatic hydrocarbyl group having from 1 to 5 carbon atoms and in which R and $R^2$ are the same or different alkyl groups and wherein $R^1$ is an alkylene group, said formulation containing less than 25% w/w of solvents or diluents having free hydroxyl groups. The formulations are particularly useful in vehicle refinishes.

8 Claims, No Drawings

SOLVENT FOR RESIN AND POLYMER FORMULATIONS

This application is a continuation of co-pending International Application No. PCT/GB96/00678 filed on Mar. 21, 1996.

The present invention relates to the use of diethers such as eg 1,3-diethoxy propane as a solvent for resin and polymer formulations having a relatively higher solids content and to render them suitable for applying as paints, coatings and films on substrate surfaces.

It is well known to use a variety of solvents to control the viscosity of surface coating systems comprising resins or polymers. Conventional systems comprising resins or polymers used for this purpose were relatively low (<40% w/w) in the so-called "solids", ie non-volatile matter. One of the problems with these conventional systems was the the presence of significant amounts of organics and solvents representing the volatile organic compound (hereafter "VOC") content thereof which were eventually discharged into the environment during eg the spraying or drying stages, or, as effluents. More recently, in order to reduce the VOCs discharged into the environment from such systems, formulations have been devised which have a relatively higher (>40% w/w) solids content. However, the presence of increased amounts of solids in such formulations has meant that conventional solvents used hitherto are not always compatible with such formulations in order to derive optimum performance. Some of the most important criteria for any solvent chosen for formulations with relatively higher solids content are their:

a. high compatibility with the resins or polymers in the formulation;
b. ability to reduce viscosity of the formulation to the desired degree;
c. chemical stability over a range of temperature conditions;
e. resistance to discoloration eg by oxidation or by undesirable reaction with the components in such formulations;
f. low odour; and
g. relatively low toxicity and low environmental impact.

The most common solvents used hitherto for such applications are esters such as eg n-butyl acetate and n-butyl propionate; ketones such as eg methyl isobutyl ketone, methyl n-amyl ketone (hereafter "MAK") and methyl iso-amyl ketone (hereafter "MIAK"); ether esters such as methoxypropyl acetate and ethoxypropyl acetate; and hydrocarbons such as eg toluene and xylenes.

Formulations comprising resins which have a high solids content but at elevated temperatures (>150° C.) in combination with diether solvents and an antioxidant are described in JP-A-57121070 for use as electrically insulating varnishes and especially for hot enamelling. These formulations cannot be used at ambient temperatures since the viscosities would be too high for use in a conventional application method. The document does refer to formulations that may be used at ambient temperature but these have much lower solids content.

Similarly, it is known from U.S. Pat. No. 4,333,845 to use coating composition thinners comprising a completely water-miscible organic based solvent capable of dissolving organic solvent based coating composition comprising (a) a water-miscible saturated aliphatic glycol or glycol ether, (b) a water-miscible monoalcohol having 1–8 carbon atoms in an amount of 10-6-parts by weight and (c) a water-miscible saturated aliphatic ketone having up to 12 carbon atoms. It is further stated that such coating compositions are usable in conjunction with a wide variety of resins including high solids urethane coating compositions described in U.S. Pat. No. 4,070,509. In this latter document, resins having a solids content of 40–100% w/w are disclosed.

One of the problems with the compositions in U.S. Pat. No. 4,333,845 is that resins used for instance in automotive re-finishes such as the resins comprising isocyanate groups are destabilised by the presence of any significant amounts of moisture or compounds containing free hydroxyl groups such as eg alcohols or monoethers of glycols. This is due to the tendency of the isocyanate groups to react prematurely and undesirably with the free hydroxyl groups whether they be in water/moisture or in the free hydroxyl group bearing solvents such as alcohols and glycol ethers. The examples of component (a) listed in column 4, lines 16–33 are all glycols or ethers which have at least one free hydroxyl group. In addition, component (b) is a monoalcohol and hence contains free hydroxyl groups.

It has now been found surprisingly that low polarity diethers such as 1,3-diethoxy propane, which are readily prepared, are solvents capable of being used in paint/coating formulations having a relatively higher solids content and have, on balance, the optimum combination of the criteria listed above and when used in the substantial absence of compounds having free hydroxyl groups give rise to formulations having ideal coating properties.

Accordingly, the present invention is a non-aqueous formulation comprising resins and/or polymers with a higher solids content and a solvent which is a diether of the general formula:

$$R.O.R^1.O.R^2 \quad (I)$$

wherein each of R, $R^1$ and $R^2$ is a straight or branched chain, saturated aliphatic hydrocarbyl group having from 1 to 5 carbon atoms and in which R and $R^2$ are the same or different alkyl groups and wherein $R^1$ is an alkylene group, said formulation containing less than 25% w/w of solvents or diluents having free hydroxyl groups.

By the expression "non-aqueous formulation" is meant herein and throughout the specification that the formulation contains less than 5% w/w of water. Again, by the expression "higher solids content" is meant herein and throughout the specification a formulation comprising at least 40% w/w of non-volatile matter in the total formulation inclusive of the solvent and preferably contains 50–80% w/w of non-volatile matter and is capable of being used at ambient temperature. In contrast, formulations with a so-called "low solids content" contain less than 40% w/w of non-volatile matter.

In the diethers of formula (I), each of the groups R, $R^1$ and $R^2$ are straight or branched chain, saturated aliphatic hydrocarbyl groups containing 1 to 5 carbon atoms and are suitably straight chain hydrocarbyl groups and preferably contain a total of 6 to 10 carbon atoms in the diether. Diethers of formula (I) that may be used as solvents in the formulations to control the viscosity thereof include inter alia $$CH_3.CH_2.O.CH_2.CH_2.CH_2.OCH_2.CH_3 \quad (II)$$

(1,3-diethoxy propane)

$$CH_3.CH_2.CH_2.CH_2.O.CH_2.OCH_2.CH_3 \quad (III)$$

(Ethyl butyl formal)

$$CH_3.CH_2.CH_2.O.CH_2.O.CH_2.CH_2.CH_3 \quad (IV)$$

(N-Propyl formal)

$$CH_3.CH_2.CH_2.CH_2.O.CH_2.CH_2.O.CH_3 \quad (V)$$

(1,2-Butoxy methoxy ethane)

Diethers such as (II) and (V) can be readily prepared by the hydrogenation of the corresponding acetal. For the purposes of illustrating the advantages of using the diethers of formula (I) as solvents in the paint industry, the present invention will be described more specifically using 1,3-diethoxy propane as a typical representative of the class of solvents falling under the generic diethers of formula (I). For instance, 1,3-diethoxy propane can be prepared by the hydrogenation of an acetal of the formula (VI):

$$CH_3.CH_2.O.CH_2.CH_2.CH_2.OCH_2.CH_3 \quad (II)$$

$$CH_3.CH_2.O.CH_2.CH_2.CH(OCH_2.CH_3)_2 \quad (VI)$$

Acetal (VI) is a 3-ethoxypropionaldehyde diethyl acetal formed by reacting acrolein with ethanol in the presence of at least one acidic reagent for an effective period of time to form the desired acetal. The acetal is converted to the 1,3-diethoxy propane (II) by catalytic hydrogenation. Methods of producing diethers such as 1,3-diethoxy propane(II) can be found in "Acrolein" edited by C W Smith, John Wiley & Sons, New York, pp 128–129 (1962) and in our published WO/90/01949 and these details are incorporated herein by reference.

In processes for producing the diethers (I) such as eg 1,3-diethoxy propane by hydrogenation of the corresponding acetal (VI), one or more of the following compounds may be generated as by-products:
a) Ethanol
b) 3-ethoxy propanol-1
c) 1-propanol and
d) ethyl propyl ether
It would be preferable to purify the diether such as 1,3-diethoxy propane from its crude mixture eg by distillation prior to use.

Diethers of formula (I) such as 1,3-diethoxy propane can be used as a solvent for formulations with a higher solids content comprising one or more of the following resin systems: acrylic, isocyanate, epoxy, polyester and melamine, and usable to apply paints, coatings or films on substrate surfaces. These diethers such as 1,3-diethoxy propane may be used alone or in combination with other conventional solvents. Thus, where these diethers are used in combination with other solvents, such a combination may be a blend of the respective solvents. For instance, the amount of a diether of formula (I) such as eg 1,3-diethoxy propane present in such a blend would depend upon the characteristics desired in the solvent/blend used.

The formulations of the present invention may contain any of the above resins systems as binders or hardeners and may optionally contain other components such as eg pigments, fillers, antioxidants, and the like.

By using diethers of formula (I) such as 1,3-diethoxy propane as a solvent, the viscosity of the formulation can be controlled as desired depending upon the type of components in the formulation, its intended end use and the method of application of the formulation on the substrate surface. For instance, the formulation can be applied by painting, brush coating and/or spraying. The degree of control of viscosity exercisable can be seen from the data in the Examples set out below.

The formulations comprising diethers of formula (I) such as eg 1,3-diethoxy propane may be applied to the substrate surfaces as paints, coatings, films, clearcoats, refinish clearcoats or varnishes. The formulations have good pot life, give coatings/films with sufficient hardness and gloss which have adequate "strike-in" performance defined as a measure of the extent to which a clearcoat formulation changes the colour of a basecoat when the former is applied on top of the latter.

Diethers such as eg 1,3-diethoxy propane are capable of meeting the stringent performance criteria for solvents used in such formulations consistent with the net reduction in VOC emissions to the environment which in turn can result in a reduction in tropospheric ozone production. When compared with conventional solvents used hitherto in such formulations: xylenes are harmful by inhalation or contact with the skin; MAK is harmful if swallowed; and diethers such as 1,3-diethoxy propane perform an altogether different function in such formulations compared with esters such as n-butyl esters. Moreover, these diethers of formula (I) eg 1,3-diethoxy propane, have a lower aquatic toxicity profile than the conventional solvents listed above.

Also, in respect of its odour, a panel of car resprayers found that the odour of formulated resins containing respectively a diether of formula (I), eg 1,3-diethoxy propane, and MAK in a can was broadly comparable, but the panel showed marginal preference for formulations containing 1,3-diethoxy propane type diethers. However, when the same panel compared the odour of the formulations in a spraybooth immediately after application of the spray, MAK was almost unanimously rated as bad and 1,3-diethoxy propane type diethers were unanimously rated as good.

The present invention is further illustrated with reference to the following Examples in which 1,3-diethoxy propane (1,3-DEP) has been used as a typical representative of the solvents of the generic formula (I). In these Examples, the following resin systems have been tested:

TABLE 1

| Resin Type | Trade Name | Manufacturer |
|---|---|---|
| Nitrocellulose | DHX 30-50 | ICI |
| CAB | CAB 381-0.5 | Eastman |
|  | CAB 381-0.1 | Eastman |
| CAP | CAP 482-0.5 | Eastman |
| Acrylic | Paraloid ® AT-400 | Rohm & Haas |
|  | Macrynal ® Resins | Hoechst |
|  | Synthalat ® Resins | Synthopol, Buxtehyde |
|  | Synocure ® 865SD | Cray Valley |
|  | Desmophen ® A260 | Bayer |
| Epoxy | Epikote ® 828 | Shell |
|  | Epikote ® 1001 | Shell |
|  | Epikote ® 1007 | Shell |
|  | Araldite ® GT7071 | Ciba Geigy |
| Melamine | Cymel ® 303 | Dyno Cyanamide |
|  | Maprenal ® MF900 | Hoechst |
| Urea | Setamine ® US11 BX-68 | Akzo |
| Isocyanate | Desmodur ® N100 | Bayer |
|  | Desmodur ® L75 | Bayer |
|  | Desmodur ® 1L | Bayer |
|  | Desmodur ® N3390 | Bayer |
|  | Tolonate ® HDB-LV | Rhone-Poulenc |
| Phenolics | J1047 | BP Chemicals |
| Polyester | Desmophen ® 800 | Bayer |
|  | Crodopol ® 080AS/80 | Croda |
|  | Uralac ® SN810 | DSM |
| Alkyd | Plastokyd ® C30AX | Croda |
|  | Uralac ® AN633-X-70 | DSM |

CAB - Cellulose acetate butyrate resin
CAP - cellulose acetate propionate resin

EXAMPLE 1

The compatibility of 1,3-diethoxy propane with various resin systems was determined by ascertaining whether a 1:1 weight mixture of resin and solvent gave rise to a clear resin solution at ambient temperature. The list of resins tested and the results achieved are shown in Table 2 below:

TABLE 2

| Resin Type | Trade Name | Manurfacturer | Compatibility |
|---|---|---|---|
| Acrylic | Paraloid ® AT-400 | Röhm & Haas | Yes |
|  | Macrynal ® SM510 | Hoechst | Yes |
|  | Macrynal ® VSM 1565 | Hoechst | Yes |
|  | Macrynal ® SM 515 | Hoechst | Yes |
|  | Synocure ® 865SD | Cray Valley | Yes |
|  | Desmophen ® A260 | Bayer | Yes |
| Epoxy | Epikote ® 828 | Shell | Yes |
|  | Epikote ® 1001 | Shell | Yes |
| Melamine | Cymel ® 303 | Dyno Cyanamid | Yes |
|  | Maprenal ® MF900 | Hoechst | Yes |
| Urea | Setamine ® US11 BX-68 | Akzo | Yes |
|  | Desmodur ® L75 | Bayer | Yes |
|  | Desmodur ® N3390 | Bayer | Yes |
|  | Tolonate ® HDB-LV | Rhone-Poulenc | Yes |
|  | Tolonate ® HDT 90 | Rhone-Poulenc | Yes |
| Polyester | Crodopol ® 080AS/80 | Croda | Yes |
| Alkyd | Plastokyd ® C30AX | Croda | Yes |
|  | Uralac ® AN633-X-70 | DSM | Yes |

EXAMPLE 2

A further set of experiments was carried out using 1,3-diethoxy propane. Whilst cellulose nitrate was insoluble in this solvent, a mixture of 1,3-diethoxy propane and n-butyl acetate in proportions of 75:25 v/v completely dissolved cellulose nitrate at ambient temperature.

EXAMPLE 3

Another set of experiments was carried out to determine the ability of the solvent to cut viscosity in a low VOC-coating. The method of assessing this property was to take a commercial resin and add the solvent until a given solids level is reached. The viscosity was then measured at that point and is the so-called "single point viscosity" of that resin in 1,3-diethoxy propane. The results are tabulated in Table 3 below:

TABLE 3

| Property | Paraloid ® AT400 @ 50% solids | Desmodur ® N3390 @ 70% solids | Cymel ® 303 at 73% solids |
|---|---|---|---|
| Ambient Temperature ° C. Viscosity | 22.5 | 22.7 | 22.9 |
| ISO 4 s | 120 | 68.6 | 37.0 |
| DIN 4 s | 38 | 25.2 | 17.8 |
| FORD 4 S | 42 | 26.9 | 18.1 |
| Brookfield mPa s | 144 | 94.7 | 49.3 |
| Viscosity @ 25° C. mPa s (Susp level) | 138 | 89.4 | 46.2 |
| VOC g/l | 475 | 316 | 286 |
| Density @ 25° C. g/ml | 0.952 | 1.053 | 1.088 |

EXAMPLE 4

A further set of experiments were carried out to demonstrate the use of 1,3-diethoxy propane in vehicle refinish (VR) clearcoat systems. In each of the following experiments, the performance was measured in respect of (i) VOC/viscosity control, (ii) pot-life effects and (iii) quality of film formed.

The standard resins (binders) used for VR clearcoats were two acrylic resins:

(a) Synthalat® A-HID 5996 (an acrylate polymer, hydroxyl No. 140-150, hydroxyl content 4.5%) sold as 80% solids in Shellsol® A/Ethoxy propyl acetate/Butyl glycol acetate in a weight ratio of 2:2:1 respectively (ex Synthopol in Buxtehyde, Germany); and (b) Macrynal® VSM1565 (an acrylate polymer, hydroxyl No. 135, hydroxyl content 4.1%) sold as 70% solids in n-butyl acetate (ex Hoechst AG, Wiesbaden, Germany).

Each of these resins was cross-linked with the most frequently used isocyanate resin as hardener in this field, Desmodur® N3390 (90% solids in n-butyl acetate, 100 g parts by weight, ex Bayer). Each of the resins (binders) was blended with the hardener in a weight ratio of 100:36 for each test solvent and then formulated to about 420 g/liter theoretical VOC content by adding Thinner A and Thinner B in separate experiments. For each formulation the viscosity was measured in DIN4 and ISO4 viscosity cups and the total solvent blend calculated. The results of six formulations made as above are given in Table 5 below:

4.1 Formulations of Synthalat® HD5996/Desmodur® N3390:

The formulation was made up using the conventional components of hardener, binder and thinner as shown below in Table 4. For each experiment, the hardener:binder weight ratio was fixed (based on the molar ratio of the OH groups on the binder:NCO groups on the hardener) and the mass of thinner calculated to give an overall VOC content of 420 g/liter.

In this case, Silicon oil (Wacker L050, 10% in xylene) was used as the flow additive. Two light stabilizers, Tinuvin® (ex Ciba Geigy), were used in order that the formulations in the experiment were a close approximation to those used commercially. The test solvents used were 1,3-diethoxy propane and MAK.

TABLE 4

| Composition | Parts by Weight |
|---|---|
| Binder: | |
| Synthalat ® HD5996 | 77 |
| Silicon Oil | 1 |
| n-Butyl acetate (n-BuAc) | 14.3 |
| Test Solvent | 5.7 |
| Tinuvin ® 292 | 0.5 |
| Tinuvin ® 1130 | 1.5 |
| 1% Dibutyl tin laurate in Solvent xylene | 0.4 |
| Thinner A: | |
| n-butyl acetate | 79 |
| Test Solvent | 21 |
| Thinner B: | |
| n-butyl acetate (n-BuAc) | 21 |
| Test Solvent | 79 |

TABLE 5

Summary Table of Formulations Synthalat ® HD5996/ Desmodur ® N3390 to 420 g/liter VOC Content

| | Formulation No | | | |
|---|---|---|---|---|
| | 1 | 2 | 3 | 4 |
| Theoretical VOC (g/liter) | 418 | 416 | 418 | 416 |
| Solvent Blend (%): | | | | |
| n-Butyl acetate | 56.2 | 56.1 | 38.3 | 38.3 |
| Test Solvent 1,3-diethoxy propane | 20.7 | | 38.8 | |

TABLE 5-continued

Summary Table of Formulations Synthalat ® HD5996/
Desmodur ® N3390 to 420 g/liter VOC Content

|  | Formulation No | | | |
| --- | --- | --- | --- | --- |
|  | 1 | 2 | 3 | 4 |
| MAK |  | 20.7 |  | 38.8 |
| Shellsol ® A |  |  |  |  |
| Ethoxy propyl acetate | 9.0 | 9.0 | 8.9 | 8.9 |
| Butyl glycol acetate | 9.0 | 9.0 | 8.9 | 8.9 |
| Solvent Xylene* | 4.5 | 4.5 | 4.5 | 4.4 |
|  | 0.6 | 0.7 | 0.6 | 0.7 |
| Viscosity: |  |  |  |  |
| DIN 4 Cup (s) | 22.6 | 21.4 | 22.7 | 20.2 |
| ISO 4 Cup (s) | 61.0 | 56.5 | 60.8 | 51.6 |

*-A mixture of ortho-, metha- and para-xylene

The above results show that all four formulations are VOC-compliant having a viscosity of under 25 seconds in a DIN 4 cup. For Formulations 1 and 2, containing about 56% n-butyl acetate and 20.7% test solvent, 1,3-diethoxy propane (1,3-DEP) had a slightly slower viscosity time than MAK. The same trend is observed for formulations 3 and 4.

4.2 Formulation of Synthalat® HD5996/Desmodur®N3390 to Spray Viscosity

The object of these experiments was to look at the film performance and pot-life of formulations containing 1,3-diethoxy propane (1,3-DEP). A formulation similar to that used for Example 4.1 above, was used. Two formulations were prepared using 1,3-DEP or MAK as the test solvent. The thinner used in each case was a mixture of n-butyl acetate (n-BuAc) with the relevant test solvent.

The coating formulation was prepared by mixing the binder with the hardener, Desmodur® N3390 (1:0•36) and diluting by thinner addition to give a spray viscosity of about 20 s in a DIN4 cup at 20° C. This experiment was carried out in two parts.

4.2.1 In the first part of the experiment, the pot-life was determined by measuring the viscosity in a viscosity cup at given time periods after mixing of the formulation. The Persoz Hardness for a 150 μm film drawn on glass and cured at 60° C. for 1 hour was also measured.

4.2.2 In the second part of the experiment, these model clearcoat mixtures were sprayed onto basecoated panels prepared with commercially available primer, filler and metallic basecoat Standox (Herberts)systems as described below.

4.2.3 Preparation, Spraying, and Testing of Panels in Spray Tests

The 'trade' finish used for baseline comparisons was a Standox® 2K metallic. All panels were given one coat of etch primer followed by four passes using primer filler. The primers were flatted using 1200 grade wet and dry to a smooth surface before the colour basecoat was applied. Clearcoat was applied over the base the same day. Thickness measurements of the flatted primer, basecoat and lacquer were taken using templates to ensure that the readings were taken at the same points on each plate.

a. Panel Preparation

Q-Panels were used. Grades QD612, QD36 and R36. The panels were degreased using white spirit and wiped with a tackrag before being sprayed.

b. Etch Primer

Standox® 405-0444 mixed with thinner to the recomended 1:1 weight ratio gave a DIN4 viscosity of 13 s. More primer was added to increase viscosity to 19 s. (18–20 s was acceptable). One pass gave coating thickness of 10–20μ.

c. Primer-Filler

Standox® 405-0458 primer

Standox® 801-8436 hardener

The primer and hardener were mixed to the recommended 4:1 ratio by weight giving a DIN 4 spray viscosity of 25 s (25–30 s). Four passes with about 5 min flashoff between coats gave a coating thickness of 100–150μ. Application of both primers was carried out using an EX1•8 needle and jet and a No 30 air cap at 4 bar pressure. The primers were left overnight to harden and then flatted using 1200 grade paper wet. The panels were rinsed using deionised water, dried and coating thickness measured before being sprayed with the metallic colour basecoat.

d. Basecoat

Standox® MSB (Talbot Vert Adriatique)

Standox® 802-05550 Thinner

Mixing Standox® MSB 1:1 with thinner gave a spray viscosity of 24 s DIN4 (20–25 s). The panels were given two coats with a 5 min flash off. Gun setup was 1–6FW needle and jet with a No.86 air cap. When all the panels had been sprayed the spraybooth was put onto bake cycle at 60° C. for 35 min.

e. Panel Test Results

Thickness was measured using Elcometer 150FN after primer coats were flatted as in 4.2.3 above, after appplication of the base coat, and after the clearcoat had cured. Either 5 or 9 points were measured, depending on the size of the panel, using a template and the average values calculated. Hardness was determined using a pendulum hardness tester after about 70 hours. Gloss was determined at 3 points on each panel and the average value taken. measurements taken at 20° and 60° using a Sheen Minigloss 101. Distinctness of Image was determined by estimating the clarity of various sizes of Landolt Rings projected onto the panel surface. The higher the number the greater the clarity. Adhesion was determined using ASTM Method 3359 (Cross-Hatch/tape). The commercial Standox® clearcoat was also used as a reference. Six Test panels were sprayed with each formulation and the thickness of all the coating layers measured. For all the trial systems, hardness, gloss, distinctness of image (DOI) and adhesion were then separately measured as an evaluation of film performance.

|  | p.b.w |
| --- | --- |
| Binder |  |
| Synthalat ® A-HD5996, 80% | 77.0 |
| Wacker L050 Silicone Oil, 10% xylene | 1.0 |
| n-Butyl Acetate | 14.3 |
| Test Solvent * | 5.7 |
| Tinuvin ® 292 | 0.5 |
| Tinuvin ® 1130 | 1.5 |
| Catalyst ** | 0.4 |
| Hardener |  |
| Desmodur ® N3390 | 100 |
| Thinner Formulation |  |
| n-Butyl Acetate | 71 |
| Test Solvent * | 29 |

* Test Solvent - 1,3-DEP or MAK
** Catalyst - 1% w/w dibutyltin dilaurate in xylene For all formulations at spray viscosity the solvent composition was approximately:

| | |
|---|---|
| n-Butyl Acetate | 57.0% |
| Test Solvent | 21.0% |
| Shellsol ® A | 8.5% |
| Ethoxy propyl acetate | 8.5% |
| Butyl glycol acetate | 4.3% |
| Solvent Xylene | 0.6% |

Results

| Test Solvent | 1,3-DEP | MAK |
|---|---|---|
| Part 1 - Pot Life and Film Hardness | | |
| Binder (g) | 101.8 | 101.9 |
| Hardener (g) | 36.6 | 36.6 |
| Thinner to 20s (g) | 36.0 | 38.4 |
| Density g/ml (at 21.5° C.) | 1.011 | 0.998 |
| Solids (% w/w) | 59.6 | 57.0 |
| Measured VOC (g/l) | 408 | 429 |
| Viscosity s DIN4 @ time-hrs | 21.8(0) | 18.2(0) |
| | 28.6(2.25) | 21.2(2) |
| | 36.0(5) | 24.8(4.75) |
| Pot Life (hours) | 7.75 | 13 |
| Hardness (Persoz) | | |
| at 2 h | 173 | 133 |
| at 4 h | 213 | 173 |
| at 1 day | 299 | 284 |
| at 2 days | 353 | 350 |
| Part 2 - Film Performance - Panel Test Results | | |
| Binder (g) | 97.8 | 113.1 |
| Hardener (g) | 35.4 | 40.1 |
| Thinner (g) | 32 | 40 |
| Viscosity s DIN4 @ 20° C. | 20.0 | 19.2 |
| Solids (% w/w) | 59.6 | 58.6 |
| Density g/ml (@ 20° C.) | 1.007 | 0.998 |
| Measured VOC g/l | 407 | 413 |
| Panel numbers | 37–42 | 43–48 |

The pot-life is taken as the time for the viscosity to double from spray viscosity. It can be seen that whereas the pot life result for MAK is certainly good, 1,3-DEP has a pot-life of 8 hours which is most acceptable. The hardness results in Part 1 are quite surprising but demonstrate clearly the ability of 1,3-DEP to promote film hardness only a short time after curing. Indeed, 1,3-DEP out-performs MAK in this regard. As for the panel test results, the final coating performance is the same regardless of the test solvent used. This is demonstrated by the overall similarity in results for hardness, gloss, DOI, and adhesion. The one surprising element is that all the test systems gave better results than the commercial Standox clearcoat. This is probably associated with the difficulty encountered when spraying the commercial system. Overall, the film performance results are very positive for 1,3-DEP. These results show that this new solvent can be used effectively alongside traditional solvents without any loss in film performance.

4.3 Reformulation with Macrynal® SM515 and VSM1565 Resins

Having established detailed data, in Sections 4.1 and 4.2 above, on the performance of 1,3-DEP against MAK, further experimental work was carried out on the reformulation of acrylic/isocyanate VR systems to incorporate 1,3-diethoxy propane.

For this study, the two Hoechst resins, Macrynal® SM515 and Macrynal® VSM1565, were employed for the formulation of 420 g/l VOC clearcoats. Details of the binder, hardener, and thinner reformulations are outlined below.

The binder:hardener ratio was carefully controlled for each of the resins. VSM 1565 is supplied at 70% solids in n-Butyl Acetate (n-BuAc) and has a hydroxyl number of 135. In this case, the binder and hardener were mixed in a ratio of 1:0.3. SM515 is also supplied at 70% solids in n-BuAc and has a hydroxyl number of 150. In this case, the binder and hardener were mixed in a ratio of 1:0.33.

The coating mixtures were prepared by blending the binder and hardener and then diluting by thinner addition to a spray viscosity of about 20 s in a DIN 4 cup. "Strike-in" tests were performed for all the mixtures and for the Standox® clearcoat by spotting onto a pre-prepared base-coated panel. A score was assigned on a 0–10 scale (0=bad, 10=good).

Panel Test Results:

| No. | Solvent | Thickness (μ) | | | Hardness | Gloss | | DOI | Adhes. (ASTM) |
|---|---|---|---|---|---|---|---|---|---|
| | | Prim | Base | Clear | | 20° | 60° | | |
| 1 | Comm. | 190 | 20 | 75 | | 72 | 89 | 20 | |
| 2 | | 185 | 25 | 75 | | 62 | 86 | 10 | |
| 3 | | 150 | 15 | 75 | 307 | 76 | 90 | | 5B |
| 4 | | 165 | 10 | 60 | 314 | 75 | 89 | | |
| 5 | | 145 | 15 | 70 | 278 | 72 | 89 | | |
| 6 | | 160 | 10 | 65 | 308 | 75 | 89 | | |
| 7 | 1,3-DEP | 185 | 25 | 90 | | 82 | 91 | 40 | |
| 8 | | 185 | 25 | 80 | | 83 | 91 | 40 | |
| 9 | | 140 | 10 | 70 | 394 | 84 | 92 | | 5B |
| 10 | | 150 | 15 | 70 | 349 | 83 | 93 | | |
| 11 | | 150 | 10 | 85 | 332 | 83 | 92 | | |
| 12 | | 155 | 10 | 85 | 292 | 83 | 92 | | |
| 13 | MAK | 190 | 20 | 90 | | 83 | 94 | 40 | |
| 14 | | 185 | 20 | 85 | | 84 | 93 | 40 | |
| 15 | | 150 | 10 | 70 | 378 | 82 | 93 | | 5B |
| 16 | | 155 | 5 | 110 | 303 | 74 | 94 | | |
| 17 | | 145 | 7 | 70 | 376 | 83 | 93 | | |
| 18 | | 145 | 10 | 95 | 285 | 74 | 92 | | |

As in Section 4.2, the clearcoat mixtures were sprayed onto the prepared basecoated panels. The panels were cured in an oven at 60° C. for 1 hour before measuring coating thickness. After 24 hours, hardness, gloss, DOI and adhesion were determined.

Binder Formulation

The following formulations are the starting point formulations: Macrynal® SM1515 and VSM 1565 (as quoted in the Hoechst paper presented by H. Schmidt, U. Epple, U. Kubillus and P. Becker, entitled "High Solids Acrylic Clear Coats For Car Refinishing" and presented at a Conference at the Waterborne, Higher Solids, and Powder Coatings Symposium, February 9–11, (1994) held at New Orleans, La., USA), and the 1,3-DEP reformulated system:

| Resin | Original p.b.w | Reformulation p.b.w |
|---|---|---|
| Macrynal ® SM515/VSM1565 | 82.0 | 82.0 |
| Wacker Silicon Oil, 10% Xylene | 1.0 | 1.0 |
| Methoxy propyl acetate | 2.0 | — |
| Ethoxy ethyl propionate | — | 3.0 |
| Solvesso ® 100 | 2.5 | 1.3 |
| Xylene | 2.5 | — |
| 1,3-DEP | — | 2.6 |
| n-BuAc | 8.0 | 8.1 |
| Tinuvin ® 292 | 0.5 | 0.5 |
| Tinuvin ® 1130 | 1.5 | 1.5 |
| Hardener | | |
| Desmodur ® N3390 | 100 | 100 |
| Thinner | | |
| n-BuAc | 60 | 34 |
| Solvesso ® 100 | 15 | 22 |
| Solvent Xylene | 25 | — |
| 1,3-DEP | — | 44 |
| Solvent Composition (VSM1565 Formulations at spray viscosity) | | |
| n-BuAc | 73.1% | 62.4% |
| Methoxy propyl acetate | 2.7% | — |
| 1,3-DEP | — | 21.8% |
| Solvesso ® 100 | 9.7% | 11.0% |
| Solvent Xylene | 14.5% | 0.6% |
| Ethoxy ethyl propionate | — | 4.1% |

Results

The results are reported in two parts. Firstly, the overall formulation parameters and strike-in results and, secondly, the panel test results.

| | VSM1565 | | SM515 | |
|---|---|---|---|---|
| | Original | Reform. | Original | Reform. |
| Binder (g) | 97.1 | 97.5 | 97.8 | 97.0 |
| Hardener (g) | 29.1 | 29.4 | 32.3 | 32.1 |
| Thinner (g) | 30.2 | 29.9 | 37.7 | 37.3 |
| Viscosity s DIN 4 | 19 | 18.2 | 19 | 18.4 |
| Solids % w/w | 55.4 | 56.1 | 53.1 | 54.0 |
| Density g/ml @ 23° | 1.004 | 1.002 | 1.001 | 0.997 |
| VOC experimental | 448 | 440 | 469 | 459 |
| calculated | 460 | 453 | 503 | 479 |
| Strike-in | 5 | 5 | 4 | 4 |

| | Panel Results | | | | | | | |
|---|---|---|---|---|---|---|---|---|
| | Thickness($\mu$) | | | Gloss | | | | Adhes. |
| Formulation | Prim | Base | Clear | 20° | 60° | DOI | Hard. | (ASTM) |
| VSM1565 | 167 | 25 | 55 | 88.0 | 97.2 | 40 | | |
| Original | 190 | 24 | 59 | 88.8 | 97.5 | | 188 | |
| | 156 | 17 | 61 | 89.1 | 98.2 | 40 | | |
| | 230 | 31 | 54 | 88.2 | 97.5 | | 175 | 5B |
| VSM1565 | 160 | 25 | 47 | 87.9 | 97.8 | 20 | | |
| Reform. | 178 | 25 | 36 | 80.8 | 96.8 | | 181 | 1B |
| | 144 | 17 | 47 | 86.3 | 97.1 | 25 | | |
| | 205 | 17 | 44 | 72.2 | 93.5 | | 165 | |
| SM515 | 171 | 30 | 61 | 80.7 | 93.5 | 40 | | |
| Original | 236 | 24 | 60 | 65.0 | 98.1 | | 148 | |
| | 168 | 18 | 75 | 86.9 | 96.6 | 40 | | |
| | 222 | 17 | 61 | 70.8 | 92.7 | | 185 | 5B |
| SM515 | 240 | 32 | 91 | 86.1 | 99.2 | | 158 | 5B |
| Reform. | 190 | 25 | 81 | 85.5 | 100.0 | | 184 | |
| | 165 | 28 | 91 | 88.0 | 100.0 | 35 | | |
| | 173 | 21 | 84 | 89.3 | 100.3 | 40 | | |
| Commercial | 177 | 22 | 76 | 90.8 | 97.6 | 30 | | |
| Standox | 216 | 27 | 50 | 84.1 | 98.0 | | 150 | 4B |
| Clearcoat | 171 | 19 | 73 | 87.5 | 99.1 | 40 | | |
| | 215 | 17 | 68 | 87.4 | 97.6 | | 161 | |

The above results show that reformulation did not adversely on film performance. The VSM1565 system with 1,3-DEP appears to have a worse performance than the original formulation but this is perhaps due to a drop in the clearcoat film thickness. However, restoring the balance with the SM515 resin in reformulations and good film thickness gave excellent results which were at least comparable if not better than the commercial Standox® system.

EXAMPLE 5

Use of 1,3-DEP in General Industrial Coatings

Industrial finishes are made up of 3 main coating types: (a) polyurethane, (b) epoxy, and (c) polyester/melamine. For this section, an ambient cure epoxy industrial finish and a polyester/melamine system for curing at elevated temperatures were selected.

5.1 Epoxy-Based White Enamel Ambient Cure Industrial Finish

A white enamel finish was used to study 1,3-DEP in a pigmented system. For Vehicle Refinish (VR) study, the coating composition was made by mixing a binder, hardener, and thinner in appropriate ratios.

| Binder Formulation | p.b.w |
|---|---|
| Epikote ® 1001, 75% in BuAc/Xylene 65:35 | 334.5 |
| Epikote ® 828 | 213.7 |
| Dynomin ® UI-19-I | 27.9 |
| TiO$_2$ R-XL Grade | 302.0 |
| Sparmite (BaSO$_4$, ex Harcross) | 687.6 |
| Bentone ® SD3 (thixotropic agent, ex Rheox) | 4.7 |
| n-Butyl Acetate | 23.3 |
| Methoxy Propanol | 20.4 |
| Solvent Xylene | 12.1 |

The mixture was blended together using a high speed mixer and then milled in two portions in an Eiger Mill to Hegmann 6.

| Hardener Formulation | p.b.w |
|---|---|
| Ancamide ® 350A | 11.9 |
| Ancamide ® 2050 | 20.4 |
| n-Butyl acetate | 9.1 |
| Methoxy Propanol | 9.1 |
| Solvent Xylene | 9.1 |

[Ancamide ® 350A is a polyamide and Ancamide ® 2050 is a reactive ketimine adduct].

Thinner Formulation

The original thinner, n-butyl acetate/Methoxy Propanol/xylene 1:1: 1, was replaced by a thinner of n-butyl acetate/Methoxy Propanol/Test Solvent 1:1:1 in the Tests. Test solvents were 1,3-DEP and MAK.

In the experiments, the binder and hardener mixes were blended in a mass ratio of 4.1:1 (binder:hardener). This blend was then let-down with the appropriate thinner to the required viscosity. Drying times were determined using the BK drying time recorder. Samples were run in duplicate using a 200 μm cube applicator to cast a film onto glass. Pencil Hardness and Mandrel were performed on a similar 200 μm film on aluminium.

Results (a) VOC (g/l)/Viscosity (s in DIN 4 cup) Profiles:

| Original | | Test Solvent | | | |
|---|---|---|---|---|---|
| Xylene | | 1,3-DEP | | MAK | |
| VOC | DIN 4 | VOC | DIN 4 | VOC | DIN4 |
| 259 | 180 | 259 | 206 | 365 | 36.0 |
| 396 | 25.2 | 369 | 34.0 | 387 | 38.0 |
| 419 | 22.2 | 391 | 27.8 | 406 | 25.0 |
| 428 | 21.0 | 411 | 23.8 | 425 | 21.8 |
| 440 | 19.8 | 420 | 22.4 | 434 | 20.8 |
| 450 | 19.0 | 442 | 20.3 | 444 | 19.8 |
| 459 | 18.6 | 453 | 18.8 | 457 | 19.0 |
| 469 | 17.8 | 462 | 18.2 | | |
| 469 | 17.4 | 467 | 17.8 | | |

(b) Pot-Life Profiles (Time in hours):

| Original | | Test Solvent | | | |
|---|---|---|---|---|---|
| Xylene | | 1,3-DEP | | MAK | |
| Time | DIN 4 | Time | DIN 4 | Time | DIN 4 |
| 0.0 | 17.8 | 0.0 | 17.4 | 0.0 | 17.8 |
| 1.0 | 19.0 | 1.0 | 18.8 | 1.0 | 19.2 |
| 1.25 | 19.8 | 2.0 | 19.6 | 2.0 | 20.3 |
| 3.0 | 20.4 | 3.0 | 20.2 | 4.0 | 21.2 |
| 4.0 | 21.8 | 4.0 | 21.0 | 5.5 | 22.4 |
| 5.0 | 22.8 | 5.0 | 21.6 | 7.0 | 24.2 |

(c) Drying Times (Drying recorder gives four stages of drying):

| Solvent | Setting Time | Through Hardening | Surface Hardness (Start) | Surface Hardness (Completion) |
|---|---|---|---|---|
| No Solvent | 1.5 | 5.8 | 7.3 | >12 |
| | 1.7 | 6.0 | 7.6 | >12 |
| Xylene | 0.7 | 4.1 | 5.6 | 8.1 |
| | 1.0 | 4.7 | 6.2 | 8.7 |
| 1,3-DEP | 1.2 | 4.7 | 6.0 | 8.2 |
| | 1.1 | 4.8 | 6.1 | 9.1 |

| Results | | | | |
|---|---|---|---|---|
| MAK | 0.7 | 4.7 | 6.4 | 8.2 |
| | 1.3 | 5.0 | 5.8 | 8.4 |

(d) Film Performance:

| | Original | Test Solvent | |
|---|---|---|---|
| | Xylene | 1,3-DEP | MAK |
| Pencil Hardness | 6H | 5H | 2H |
| Mandrel % | 4.6 | 3.1 | 6.8 |

The above results show that 1,3-DEP can be successfully used in epoxy-based pigmented industrial finishes. Also, 1,3-DEP can be used in the finishes without any compatibility problems.

In terms of the viscosity/VOC profiles, MAK, 1,3-DEP and xylene all had very similar performances. Similarly, in the pot-life experiments, MAK and 1,3-DEP gave the best performances followed by xylene. The drying times were shown to be very similar, regardless of the solvent type.

5.2 Polyester/Melamine White Enamel 120° C. cure Industrial Finish

The formulation for this part was taken from Shell resins US documentation "Polyesters based on Cardura®E-10 resin in baked Coatings." (SC:1411-92). Cardura® E-10 is a high solids polyester, LR-2012. The experimental details for the reaction are described below:

Preparation of High Solids Polyester LR-2012

Overall Resin Composition (1 Kg)

| Succinic Anhydride | 329.5 g |
|---|---|
| Trimethylol Propane | 176.8 g |
| Cardura ® E-10 | 493.7 g |

Procedure:

The reaction was carried out in a 1L flanged flask fitted with stirrer, thermopocket, condenser, and dropping funnel. The flask contents under nitrogen cover was heated by a Eurotherm controlled isomantle.

First Stage

| Succinic anhydride | 247.0 g |
|---|---|
| Trimethylol Propane | 132.8 g |

These were charged to the flask and the temperature gradually increased to 110° C. when the reaction became exothermic. The flask was then cooled. The temperature increased up to 160° C. over about 15 mins. The flask was then cooled and maintained at 140° C.

Second Stage

| Cardura ® E-10 | 370.6 g |
|---|---|

The Cardura® E-10 was added from a dropping funnel over 65 mins to the reaction vessel. Upon completion of the Cardura addition the acidity of the mixture was determined as follows: 1–2 g sample dissolved in 25 ml tetrahydrofuran and titrated with 0·1014N KOH in methanol using phenolphthalein indicator.

|  | Acidity measurement | | |
| --- | --- | --- | --- |
| Time of day | Sample (g) | Titre (g) | Acidity (mg KOH/g) |
| 11.30 | 1.64 | 23.9 | 82.09 |
| 11.45 | 1.73 | 24.0 | 78.9 |
| 12.10 | 2.69 | 35.8 | 75.7 |

At the end-point of the cook, the resin acidity was about 7.5 mg/g. The heating was stopped at this point and the flask allowed to cool slowly. A 25 g sample was taken at 60° C. for testing. This was still just mobile at ambient and the resin was not diluted with solvent.

| Product Results | |
| --- | --- |
| Product | 650 g |
| Acidity | 75.8 mgm/g |
| Density @ 23° C. | 1.17 g/ml |
| Solids content | 97.5% |

Molecular Wt. Distribution (Mean of 2):
Mn = 910
Mw = 1715
Mw/Mn = 1.9

The overall formulation used is described below:

|  | p.b.w | |
| --- | --- | --- |
| Ball Mill Paste | | |
| LR-2012 Polyester (undiluted) | 5.14) | |
| Titanium dioxide | 31.70) | Ball mill for 24h 48.25% |
| Xylene | 9.51) | to Hegmann <5μ |
| n-Butanol | 1.90) | |
| Let down | | |
| LR-2012 Polyester | 25.77) | |
| Cymel ® 303 | 16.71) | |
| Test solvent | 7.55) | 50.54% |
| n-Butanol | 0.51) | |
| Catalyst | | |
| Cycat ® 400* | 0.50) | 1.21% |
| Silicone oil | 0.71) | |

*-This is an organic sulphonic acid catalyst ex Dyno Cyanamid
Mix ratio - Paste:let-down:catalyst = 1:1.05:0.025
Thinner - 1:1 n-Butyl Acetate:Test Solvent The Ball Mill paste was prepared by charging the TiO$_2$ in two lots to the mill. Approximately 0.6 of the calculated TiO$_2$ was added to the mill followed by the resin and solvent. The mixture was stirred to a thin paste. The remaining TiO$_2$ was then added, with the balls, and then milled for 24 hrs. This gave material of Hegmann fineness >8.

|  | Charge to mill (g) |
| --- | --- |
| TiO$_2$ | 270.9 + 180.1 |
| LR-2012 Polyester | 73.1 |
| Xylenes | 135.4 |
| n-Butanol | 27.1 |

The Ball Mill paste was then mixed with the appropriate let-down mixtures which were pre-mixed to contain test solvent. After catalyst addition thinner was then added to create VOC (g/l)/viscosity (s DIN 4 cup) profiles.

The solvent composition of the mix at spray viscosity was approximately:

| Test Solvent | 43% |
| --- | --- |
| Xylene | 31% |
| n-Butanol | 8% |
| n-Butyl Acetate | 18% |

The coating mixtures were cast onto Aluminium test plates using a 200$1\mu$ spreader bar. The mixtures before and after the addition of solvent ('18 s') were evaluated. The panels were cured at 120° C. for 30 minutes. Pencil hardness was measured 2 hours after curing, mandrel deformation and coating thickness were determined at 24 hours.

| Results | | | | | |
| --- | --- | --- | --- | --- | --- |
| (a) VOC (g/l)/Viscosity (s DIN 4 cup) Profiles: | | | | | |
|  | Test Solvent | | | | |
| Xylene | | 1,3-DEP | | MAK | |
| VOC | DIN 4 | VOC | DIN 4 | VOC | DIN 4 |
| 282 | 71.0 | 286 | 61.0 | 278 | 56.8 |
| 309 | 48.0 | 333 | 32.2 | 304 | 44.0 |
| 342 | 32.3 | 347 | 28.8 | 329 | 28.6 |
| 366 | 25.0 | 365 | 24.5 | 352 | 22.8 |
| 389 | 21.2 | 382 | 21.0 | 363 | 21.4 |
| 402 | 19.4 | 392 | 19.7 | 375 | 19.8 |
| 414 | 18.3 | 403 | 19.0 | 388 | 18.2 |
| 424 | 17.2 | 415 | 17.8 | | |

(b) Film Performance:
For each solvent, the first line of results are the Mill Paste: Let Down: Catalyst mixtures before the addition of the Thinner. The second line of results are those for the final mixtures at about 18s flow time.

| Test Solvent | Hardness (Pencil) | Mandrel* (cm) | Thickness (μ) |
| --- | --- | --- | --- |
| Xylene | 4H | 0(>16.7%) | 65–75 |
|  | 6H | 4.06(5.9%) | 55–65 |
| 1,3-DEP | >6H | 3.05(5.5%) | 45–65 |
|  | 6H | 4.8(5.2%) | 55–65 |
| MAK | >6H | 1.8(9.3%) | 70–80 |
|  | 5H | 4.8(5.2%) | 45–60 |
| n-BuProp | 4H | 0.76(12.5%) | 65–85 |
|  | 6H | 4.8(5.2%) | 50–70 |

*Mandrel results are the distance of the end of any cracking from the small end of the mandrel in inches and the % elongation where failure occurs in brackets.

The results show MAK to be the most effective at cutting viscosity with the other two solvents being very similar at around 18 s flow time. 1,3-DEP gave a better performance than xylene at the lower VOC levels. The film performance results are very encouraging. Curing at elevated temperature with 1,3-DEP as solvent gave good hard films. When comparing the results for 1,3-DEP with MAK, excellent performance similarity is found for the experimental solvent with the traditional solvent. This shows the compatability of 1,3-DEP within the formulation used and its ability to influence the film formation in the same way as MAK. To conclude, 1,3-DEP can be effectively used within high solids polyester/melamine systems cured at an elevated temperature. From the above results it can be seen that:
a) 1,3-DEP shows good compatibility with higher solids acrylic, epoxy, amino, and isocyanate resins. Mixed compatibilty is found with more traditional resins.
b) In single resin systems, 1,3-DEP shows good viscosity cutting power—very similar to n-Butyl Acetate. In performance terms against solvents of comparable evaporation rate, this places 1,3-DEP is marginally behind MAK.
c) In fully formulated acrylic/isocyanate, epoxy, or polyester/melamine systems, the order of viscosity cutting power appears to be MAK >1,3-DEP.
d) Reformulation of conventional Vehicle Refinish clearcoats, using state-of-the-art acrylic/isocyanate systems, showed VOC benefits. At spray viscosity, these were of the order of 8–10 g/l when 20% 1,3-DEP was used in the reformulated solvent blend.
e) In general in Vehicle Refinish clearcoats, formulations containing 1,3-DEP show good pot-life, gloss, hardness, DOI, adhesion, and strike-in performances. No adverse results are seen when compared with formulations containing conventional solvents.
f) In Industrial Finishes, pigmented systems containing 1,3-DEP were cured at both room temperature and at 120° C. and performed well under both sets of conditions, showing good drying times, pot-life, and film hardness. These systems were based on epoxy or polyester/melamine resin technology. The results show the ability of 1,3-DEP to handle a range of crosslinking chemistry.

EXAMPLE 6

The solvents of the present invention were tested by a panel of sprayers who compared the odour of conventional paint formulations comprising a high solids content clearcoats for auto refinish containing MAK as solvent with those containing 1,3-DEP instead as solvent in the same formulation. Two tests were performed.

In the first, the odour of the paint formulation (containing the relevant solvent) in a can was assessed. In the second, the odour of the same paint formulation (containing the relevant solvent) was assessed as it was sprayed in a spraybooth under typical automotive vehicle re-finishing conditions used in the industry. The results are tabulated below:

| Solvent | Bad | Moderate | Fair | Good | Excellent |
|---|---|---|---|---|---|
| | | Odour from Can | | | |
| 1,3-DEP | 6 | 8 | 9 | 5 | 0 |
| MAK | 8 | 8 | 6 | 5 | 1 |
| | | Odour when sprayed in a Spraybooth | | | |
| 1,3-DEP | 1 | 4 | 7 | 9 | 0 |
| MAK | 14 | 6 | 1 | 0 | 0 |

The above results show that the solvent 1,3-DEP of the present invention is far more acceptable to the operatives in terms of their odour under typical spraying conditions in a typical automotive vehicle re-finishing process than the conventionally used methyl n-amyl ketone (MAK) solvent.

EXAMPLE 7

Single point viscosities were measured using ethoxybutoxymethane (ethyl butyl formal, hereafter abbreviated "EBF") which is a structural isomer of 1,3-DEP. The performance characteristics of this diether solvent together with those of 1,3-DEP and MAK were measured using a commercial VR clearcoat systems and a procedure described in Example 3 (Table 3) above but with different resins. The resins used were:

| | |
|---|---|
| Macrynal ® VSM 1565 | (high solids 2K VR acrylic resin - 70% w/w solids in n-BuAc) |
| Macrynal ® SM 515 | (medium solids 2K VR acrylic resin - 70% w/w solids in n-BuAc) |
| Tolonate ® HDT 90 | (isocyanate resin - 90% w/w solids in 1:1 Solvesso ® 100/ n-BuAc) |

| Physical Property | EBF | 1,3-DEP |
|---|---|---|
| Density (g/ml) | 0.828 | 0.834 |
| Viscosity (cSt or mm$^2$/s) | 0.776 (25° C.) | 0.875 (20° C.) |
| Flashpoint (PMCC) | 35° C. | 34° C. |
| Evaporation rate (n-BuAc = 1) | 0.74 | 0.59 |

The density, solids levels and single point viscosities of the solutions are given below:

7.1 Density (g/ml at 25° C.):

| | EBF | 1,3-DEP | MAK |
|---|---|---|---|
| Macrynal ® VSM 1565 | 0.971 | 0.974 | 0.963 |
| Macrynal ® SM 515 | 0.970 | 0.973 | 0.962 |
| Tolonate ® HDT 90 | 1.048 | 1.051 | 1.077 |

7.2 Solids Levels:

| | EBF | 1,3-DEP | MAK |
|---|---|---|---|
| Macrynal ® VSM 1565 | 49.8 | 49.9 | 50.0 |
| Macrynal ® SM 515 | 49.9 | 49.7 | 49.8 |
| Tolonate ® HDT 90 | 70.0 | 69.7 | 69.9 |

7.3 Single point viscosities (cP or mPa s at 25° C.):

| | EBF | 1,3-DEP | MAK |
|---|---|---|---|
| Macrynal ® VSM 1565 | 66.31 | 60.42 | 51.26 |
| Macrynal ® SM 515 | 98.49 | 89.40 | 72.98 |
| Tolonate ® HDT 90 | 43.34 | 45.23 | 41.39 |

These results show that EBF and 1,3-DEP have acceptable viscosity cutting power when compared with MAK.

EXAMPLE 8

Using Macrynal® VSM 1565 resin in the same binder and hardener systems as used in Example 4.3 above, the performance of the solvents EBF, 1,3-DEP and MAK in clearcoat systems was evaluated by determinng the pot-life of clearcoats by measuring the viscosity in a viscosity cup at given time periods. The clearcoats were sprayed on to prepared panels (PPG Deltron primer and metallic basecoat) and cured at 60° C. for 60 minutes. The physical properties of the cured clearcoats were determined after 7 days. Strike-in was determined on prepared panels sparayed up to the basecoat level using the uncured clearcoats. The results are tabulated below.

| Component/Property | EBF | 1,3-DEP | MAK | ORIGINAL |
| --- | --- | --- | --- | --- |
| Binder used (g) | 149.8 | 150.1 | 149.9 | 149.9 |
| Hardener used (g) | 45.1 | 44.9 | 45.0 | 44.9 |
| Thinner used(g) | 39.2 | 39.4 | 36.5 | 41.9 |
| Viscosity (secs, DIN 4 cup) | 22 | 22 | 22 | 21 |
| Solids content (% w/w) | 57.7 | 58.8 | 57.5 | 57.1 |
| Pot-life (hrs, time taken for viscosity value to double) | 8 | 10 | 10.5 | 10 |
| Density (g/ml at 25° C.) | 1.006 | 1.004 | 1.003 | 1.008 |
| VOC (g/l) | 419 | 409 | 423 | 424 |
| Film thickness (clearcoat μm) | 53 | 50 | 55 | 51 |
| Crosshatch Adhesion | 5B | 5B | 5B | 4B |
| DOI | 60 | 60 | 60 | 60 |
| Strike-in | 6 | 6 | 6 | 6 |
| Hardness (Perzoz) | 634 | 560 | 575 | 531 |
|  | 600 | 572 | 570 | 552 |
|  | 625 | 582 | 560 | 545 |

The above results show that EBF performs as well as 1,3-DEP in this 2K system. Surprisingly, there was little difference in the amount of thinner required to thin to spray viscosity (DIN 4) between 1,3-DEP and EBF systems which would not have been expected from consideration of the respective single point viscosities. EBF also produces films of increased hardness.

What is claimed is:

1. A formulation comprising resins and/or polymers and a diether solvent, said diether solvent being selected from the group consisting of:

$$CH_3.CH_2.O.CH_2.CH_2.CH_2.OCH_2.CH_3 \quad (II)$$

(1.3-diethoxy propane)

$$CH_3.CH_2.CH_2.CH_2.O.CH_2.OCH_2.CH_3 \quad (III)$$

(ethyl butyl formal)

$$CH_3.CH_2.CH_2.O.CH_2.O.CH_2.CH_2.CH_3 \quad (IV)$$

(N-propyl formal)

$$CH_3.CH_2.CH_2.CH_2.O.CH_2.CH_2.O.CH_3 \quad (V)$$

(1,2-butoxy methoxy ethane)

wherein said formulation is sprayable at ambient temperatures and contains less than 5% w/w of water, contains less than 25% w/w of said solvent, and comprises at least 40% w/w of non-volatile matter inclusive of the solvent.

2. A formulation according to claim 1 which comprises one or more of the following resin systems: acrylic, isocyanate, epoxy, polyester and melamine.

3. A formulation according to claim 1 wherein said formulation has from 50–80% w/w of non-volatile matter inclusive of the diether solvent.

4. A formulation according to claim 1 wherein said formulation comprises additional components selected from pigments, fillers and antioxidants.

5. A formulation according to claim 1, said formulation being capable of being applied as paints, coatings, films, clearcoats, refinish clearcoats or varnishes on substrate surfaces at ambient temperatures.

6. A formulation as claimed in claim 1, wherein the solvent is 1,3-diethoxy propane.

7. A formulation as claimed in claim 1, wherein said solvent is blended with at least one further solvent.

8. A formulation as claimed in claim 7 wherein said further solvent is n-butyl acetate, ethoxy propyl acetate, butyl glycol acetate, butanol, methoxy propanol and/or xylene.

* * * * *